B. HENTHORN.
MILK CAN LOCK.
APPLICATION FILED NOV. 9, 1917.

1,268,841.

Patented June 11, 1918.

Witness

B. Henthorn, Inventor

By Cashrow & Co., Attorneys

UNITED STATES PATENT OFFICE.

BENJAMINE HENTHORN, OF OSAWATOMIE, KANSAS.

MILK-CAN LOCK.

1,268,841.  Specification of Letters Patent.  Patented June 11, 1918.

Application filed November 9, 1917. Serial No. 201,097.

*To all whom it may concern:*

Be it known that I, BENJAMINE HENTHORN, a citizen of the United States, residing at Osawatomie, in the county of Miami and State of Kansas, have invented a new and useful Milk-Can Lock, of which the following is a specification.

The subject of this invention is a lock for milk cans, and the objects of the invention are, first, to provide a lock for securely fastening the top or cover of a milk can in place, second, to provide a lock which may be quickly put in place and released, third, to provide a simple, cheap, and efficient lock.

With the foregoing and other objects in view which will appear as the description proceeds, the invention resides in the combination and arrangement of parts, and in the details of construction herein described, and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1:
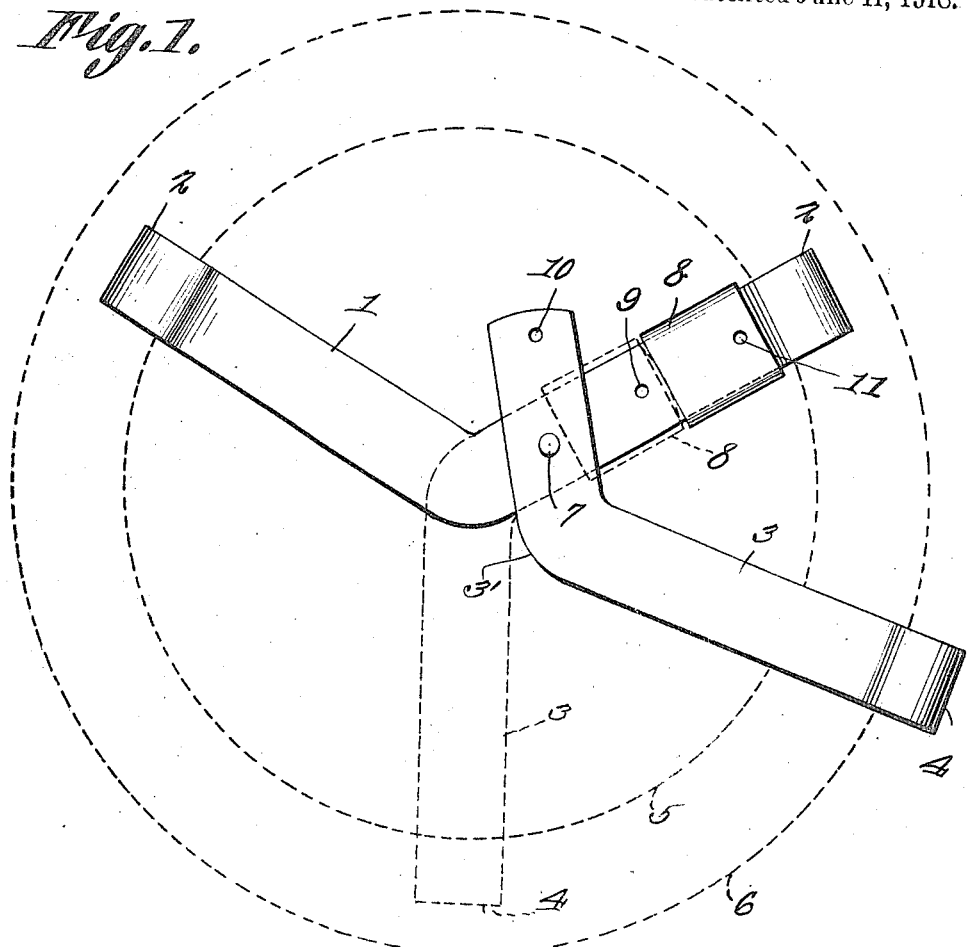
Figure 1 is a plan view of the lock in position to be placed upon a can, the locked position indicated in dotted lines and the can also shown in dotted lines.
Figure 2:
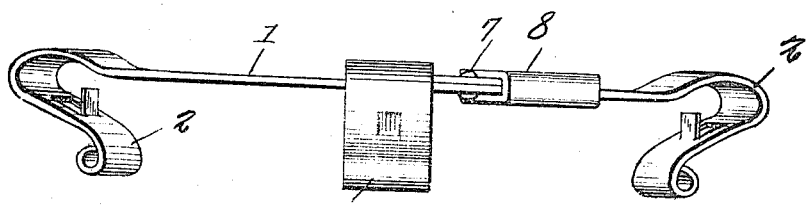
Fig. 2 is a view in elevation of the lock.

Referring to the drawing by numerals of reference:—

A formed strap 1 presents integral, diverging arms the free end of each of which is bent to form a hook 2 adapted to take over the rim of the flaring mouth of a milk can.

Pivotally secured to the strap 1, near the point of divergence of the arms thereof, is an arm 3 formed with a bent or hooked end 4 adapted to engage the rim 5 of the mouth of a milk can 6. The arm 3 is formed with an elbow 3', as seen most clearly in Fig. 1, and it is preferably in the short portion of the arm extending beyond this elbow that the pivot pin 7 is located.

When the arm 3 is swung to locking position the short portion beyond the elbow will overlie and aline with an arm of strap 1 and upon this arm slides a sleeve 8 which is adapted to encircle the strap 1 and arm 3 when the parts are in alinement.

An aperture 9 is formed in the strap 1 which alines, when the parts are in locked position, with an aperture 10 formed in the arm 3. The sleeve 8 is provided with an aperture 11 adapted to aline with the alining apertures 9 and 10 when the sleeve is moved to embrace the arm 3.

A pin, wire or other element, not shown, may be inserted in the alining apertures 9, 10, and 11 for the purpose of locking the parts against accidental displacement.

In practice the device is used as follows:—

The arm 3 is swung back as shown in Fig. 1 and the lock slipped over the mouth of the milk can. The arm 3 is then swung to the position indicated in dotted lines, which will bring the bent ends 2 and 4 beneath the arm to firmly clamp the top in place. The sleeve 8 is then slid to position to embrace the short end of the arm 3 and a wire, pin, or the like inserted through the apertures.

Having thus described the invention, what is claimed as new and sought by Letters Patent, is:—

1. A lock for milk cans, comprising a formed strap presenting diverging arms, bent ends on the arms, an arm pivotally secured to the strap, a bent end on said arm, an angled portion on the arm and adapted to partly overlie the strap, and means for locking the angled portion of the arm to the strap.

2. A lock for milk cans, comprising a formed strap providing diverging arms, bent ends on the arms, an arm formed with an elbow and pivotally secured adjacent the elbow to the strap, a bent end on the arm, a short portion of the arm adjacent the elbow adapted to overlie the strap, and means for locking said short portion of the arm to the strap.

3. A lock for milk cans, comprising a formed metal strap, providing diverging arms, angled ends on the arms, an arm formed with an elbow and pivotally secured to the strap, a short portion of the arm beyond the elbow adapted to overlie the strap, an angled end on said arm, and a sleeve on the strap and adapted to embrace the overlying portion of the arm to hold the parts in locked position.

In testimony that I claim the foregoing as my own, I have hereto affixed my signature in the presence of two witnesses.

BENJAMINE HENTHORN.

Witnesses:
J. LILLARD JOHNSON,
J. W. ANDERSON.

Copies of this patent may be obtained for five cents each, by addressing the "Commissioner of Patents, Washington, D. C."